(12) United States Patent
Zaitsev

(10) Patent No.: US 8,863,289 B2
(45) Date of Patent: Oct. 14, 2014

(54) PORTABLE SECURITY DEVICE AND METHODS FOR DETECTION AND TREATMENT OF MALWARE

(75) Inventor: Oleg V. Zaitsev, Smolensk (RU)

(73) Assignee: Kaspersky Lab ZAO, Moscow (RU)

( * ) Notice: Subject to any disclaimer, the term of this patent is extended or adjusted under 35 U.S.C. 154(b) by 65 days.

(21) Appl. No.: 13/482,490

(22) Filed: May 29, 2012

(65) Prior Publication Data
US 2013/0007883 A1    Jan. 3, 2013

(30) Foreign Application Priority Data

Jun. 28, 2011  (RU) ................................ 2011126325

(51) Int. Cl.
*G06F 21/00* (2013.01)
*G06F 21/56* (2013.01)

(52) U.S. Cl.
CPC .................................. *G06F 21/567* (2013.01)
USPC ............................................ 726/24; 713/188

(58) Field of Classification Search
None
See application file for complete search history.

(56) References Cited

U.S. PATENT DOCUMENTS

| | | | |
|---|---|---|---|
| 6,934,817 B2 * | 8/2005 | Ellison et al. .................. | 711/153 |
| 7,487,543 B2 | 2/2009 | Arnold et al. | |
| 7,591,018 B1 | 9/2009 | Lee | |
| 7,613,926 B2 * | 11/2009 | Edery et al. ..................... | 713/181 |
| 7,694,328 B2 * | 4/2010 | Joshi et al. .......................... | 726/2 |
| 7,881,919 B2 | 2/2011 | Trumble et al. | |
| 8,055,910 B2 * | 11/2011 | Kocher et al. .................. | 713/193 |
| 8,074,115 B2 * | 12/2011 | Stolfo et al. ................. | 714/38.1 |
| 8,079,086 B1 * | 12/2011 | Edery et al. ...................... | 726/24 |
| RE43,103 E * | 1/2012 | Rozman et al. .................. | 726/23 |
| 8,407,785 B2 * | 3/2013 | Sidiroglou et al. ............. | 726/22 |
| 8,443,439 B2 * | 5/2013 | Lamastra et al. ............... | 726/22 |
| 8,468,244 B2 * | 6/2013 | Redlich et al. ................ | 709/225 |

(Continued)

FOREIGN PATENT DOCUMENTS

| | | |
|---|---|---|
| EP | 1748342 A1 | 1/2007 |
| EP | 1883033 A1 | 1/2008 |
| RU | 22718 U1 | 4/2002 |

OTHER PUBLICATIONS

An, Gaeil; Bae, Guntae; Kim, Kiyoung; Seo, Dongil. Context-aware Dynamic Security Configuration for Mobile Communication Device. 2009 3rd International Conference on New Technologies, Mobility and Security (NTMS). Pub. Date: 2009. Relevant pp. 1-5. http://ieeexplore.ieee.org/stamp/stamp.jsp?tp=&arnumber=5384818.*

Prior Art Search Report received in the priority RU application No. 2011126325.

(Continued)

*Primary Examiner* — Michael R Vaughan
*Assistant Examiner* — Jeremiah Avery
(74) *Attorney, Agent, or Firm* — Arent Fox LLP; Michael Fainberg

(57) ABSTRACT

Disclosed is a portable security device and method for detection and treatment of computer malware. The security device includes a communication interface for connecting to a computer, a memory for storing a set of data for use in malware detection experiments, and an antivirus engine configured to perform one or more malware detection experiments on the computer. A malware detection experiment includes simulating a connection to the computer of a data storage device containing a predefined set of data. The antivirus engine further configured to identify modifications in the set of data contained in the data storage device after termination of one or more malware detection experiments, analyze a modified set of data for presences of computer malware, determine a treatment mechanism for the detected malware, perform treatment of the detected malware on the computer, and generate user reports.

21 Claims, 5 Drawing Sheets

(56) References Cited

U.S. PATENT DOCUMENTS

| | | | |
|---|---|---|---|
| 8,468,602 B2* | 6/2013 | McDougal et al. | 726/23 |
| 8,474,031 B2* | 6/2013 | Vennelakanti et al. | 726/11 |
| 8,549,656 B2* | 10/2013 | Blaisdell et al. | 726/27 |
| 2009/0320137 A1 | 12/2009 | White et al. | |
| 2010/0251363 A1 | 9/2010 | Todorovic | |

OTHER PUBLICATIONS

Honeypot Manager, Proactive Means of Detecting Intrusions and Unauthorized Access to Information, Based on the Simulation Data and the Analysis of Visitors' Access to the Simulated Applications and Network Services, published on Apr. 30, 2010, pp. 1-2, Internet publication, at http://www.securitycode.ru/documents/upload 57.

* cited by examiner

PORTABLE SECURITY DEVICE AND METHODS FOR DETECTION AND TREATMENT OF MALWARE

CROSS-REFERENCE TO RELATED APPLICATIONS

This application claims benefit of priority under 35 U.S.C. 119(a)-(d) to a Russian Application No. 2011126325 filed on Jun. 28, 2011, which is incorporated by reference herein.

TECHNICAL FIELD

The invention relates to the field of computer security, and, in particular to a portable security device and methods for use thereof for detection and treatment of malware.

BACKGROUND

The popularity of computer and network technologies has been rapidly growing for the past two decades; however, it has been accompanied by a steady growth in cybercrime, which ranges from relatively harmless cases, such as distribution of unsolicited e-mail, commonly known as spam, to more serious cases of cybercrimes, such as denial of service attacks, stealing of confidential financial information, and even cyber warfare and terrorism. It has become obvious that it is imperative to aggressively combat cybercrime. And, one of the most commonly used means for protecting computers from cyber attacks is antivirus software. However, current generation of antivirus software solutions has shortcomings.

Antivirus applications are generally resource intensive, which has detrimental effect on the productivity of computers on which they are deployed, especially during performance of frequent and complex antiviral tasks. Examples of such tasks are checking hard disk for malware, which significantly loads computer's disk system, and frequent updates of antivirus databases, which consumes network bandwidth. The consumption of processing resources by antivirus application especially affects personal computers (PCs), notebooks and other types of computers that have limited processing capabilities. It has been observed by the inventors that the processing load on such computers can be reduced if the antivirus application is run from a separate device, which can be connected to the computer to perform antivirus testing tasks.

SUMMARY

Disclosed herein is a portable security device and methods for use thereof for purpose of detection and treatment of computer malware. In one example embodiment, the security device includes a communication interface for connecting to a computer, a memory for storing a set of data for use in malware detection experiments, and an antivirus engine configured to perform one or more malware detection experiments on the computer. A malware detection experiment includes simulating a connection to the computer of a data storage device containing a predefined set of data. The antivirus engine further configured to identify modifications in the set of data contained in the data storage device after termination of one or more malware detection experiments, analyze a modified set of data for presences of computer malware, determine a treatment mechanism for the detected malware, perform treatment of the detected malware on the computer, and generate user reports.

In another example embodiment, a method for detection and treatment of computer malware comprises connecting a portable security device to a computer and performing one or more malware detection experiments by the security device on the computer. The malware detection experiment includes simulating by the security device a connection to the computer of a data storage device containing a predefined set of data. The method further includes identifying modifications in the set of data contained in the data storage device after termination of the one or more malware detection experiments. The method further includes performing antivirus analysis of the modified set of data to determine if the modifications to the set of data were performed by a malware on the computer. The method further includes determining a treatment mechanism for the detected malware and performing treatment of the detected malware on the computer.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of a system and methods for use thereof for detection and treatment of computer malware. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
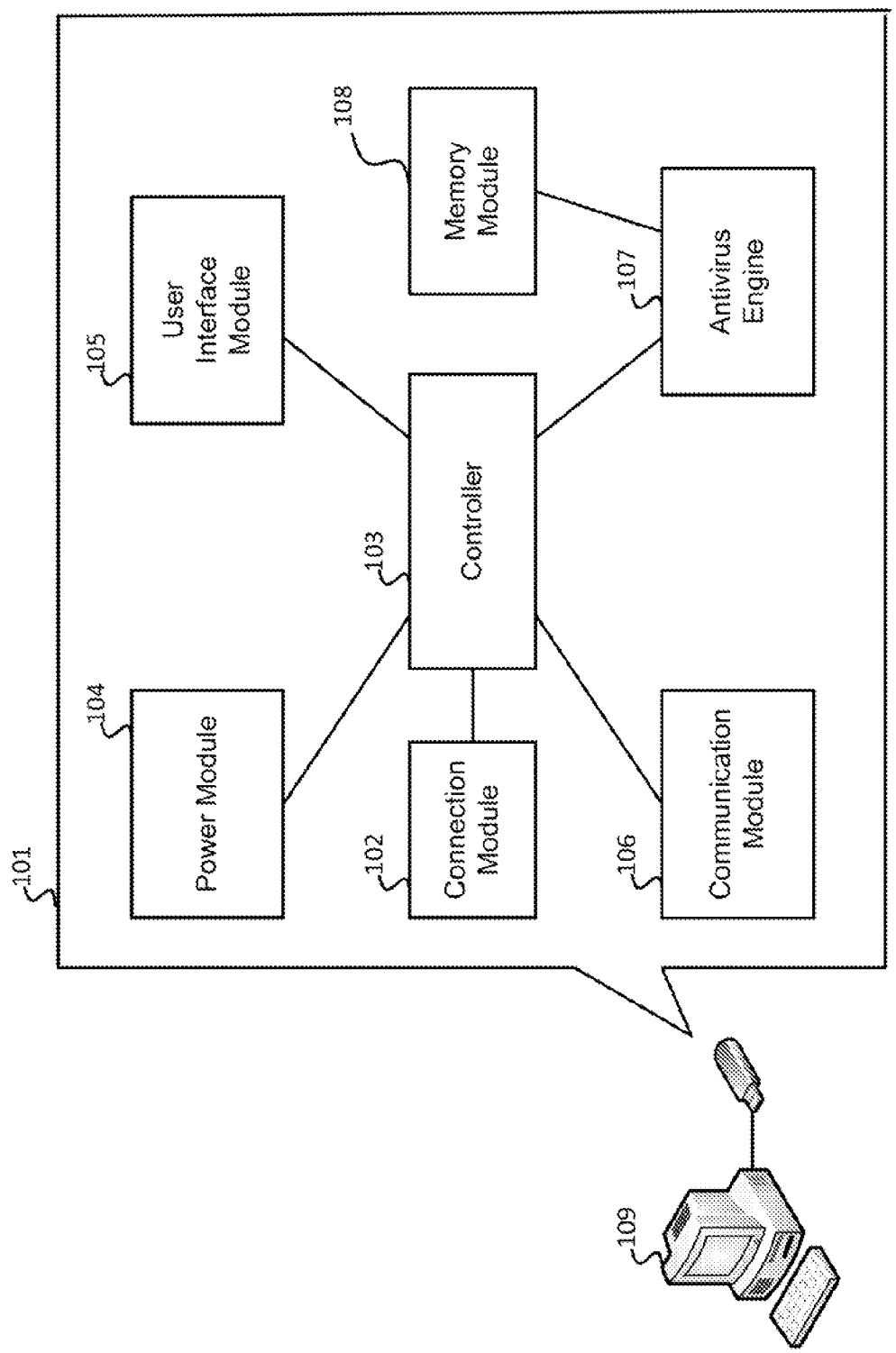
FIG. 1 illustrates a schematic system diagram of a portable security device for detection and treatment of malware on personal computers according to one example embodiment.

FIG. 1 illustrates an example embodiment of a schematic system diagram of a portable security device for detection and treatment of harmful software (also referred herein as malware), such as viruses, Trojans and worms, and other types of malicious software. In one example embodiment, the portable security device 101 (also referred herein as system 101) may be implemented as a Flash drive, which connects to a PC 109 through a connection module 102, such as a USB or Ethernet port. In other embodiments, the system 101 can be connected to PC 109 with the aid of other known connection technologies, such as, for example, eSATA and FireWire, and also wireless interfaces, such as Bluetooth or WiFi. It should also be noted that system 101 may have several different connection modules 102.

The connection module 102 is connected with a controller 103, which is configured to control transmission of data between modules of system 101. Controller 103 is connected with a communication module 106 which provides connectivity with other PCs, remote servers or other networked devices connected to the Internet. The communication module 106 can work, using contemporary standards of wireless connection, such as UMTS/CDMA (3G), WIMAX/LTE (4G), WiFi, HSPA, EDGE, and also using wire technologies, as Ethernet, optical fiber, ASDN, xDSL and other. It should be noted that communication module 106 may be optional, and connection with other PCs, remote antivirus servers or other network devices may be performed using connection module 102 though network connection of computer 109.

Controller 103 is also connected to a power module 104 which provides power during off-line operation of system 101 for a long time without need for recharging. The power module 104 can be galvanic cell or battery, for example, lithium-ionic. Also the power module 104 can be an ionistor, which is an energy accumulating capacitor. The ionistor-type device usually charges very quickly and then operates as a battery. It should be noted that power module 104 may be optional, and PC 109 may provide the necessary power through the USB connection 102 for the operation of system 101 when it is connected to the PC 109.

Controller 103 is also connected with antivirus engine 107. Antivirus engine 107 is configured to perform several tasks. One of the tasks is simulation of connection to PC 109 of data storage devices of different types, such as Flash drives. Information necessary to perform this type of simulation is transferred from antivirus engine 107 through controller 103 to the connection module 102 to the PC 109. In particular, the antivirus engine 107 can simulate the connection of a data storage device of any model, type or size with pseudorandom data stored thereon, as well as random series numbers, as will be described in great detail herein below.

Also, antivirus engine 107 is configured to perform antivirus analysis of data obtained during operation of system 101, namely in the course of the simulation of the connection of a data storage device for purpose of detecting harmful software on PC 109. Based to the results of the antivirus analysis, antivirus engine 107 is configured to perform treatment of PC 109, for example, automatic removal of malware from PC 109. Antivirus engine 107 may include one or more of the following antivirus products, including, but not limited to, Kaspersky Antivirus, Kaspersky Antivirus for Windows workstations, Kaspersky Antivirus for Linux workstations, McAfee Antivirus, Norton Antivirus or similar products.

In one example embodiment, antivirus engine 107 can be implemented in the form of several separate software modules, each of which is configured to perform a specific task. For example, one module may be provided for simulation of a data storage device; another module may be provided for antivirus analysis of data on PC 109; and a third module may be provided for treatment of PC 109 from malware detected thereon. During operation of the system 101, the antivirus engine 107 may need to use random access memory, which, in one example embodiment, may be allocated and controlled by the controller 103.

Antivirus engine 107 is also connected with a memory module 108. The memory module 108 may be used to store information necessary for the operation of the antivirus engine 107, such as data, necessary for simulation of the data storage device, and also data for removal of malware from PC 109. Antivirus engine 107 also loads into the memory module 108 results of the antivirus analysis. Analysis result can be subsequently transferred to the antivirus servers of the antivirus software developer using communication module 106. The memory module 108 can be, for example, Flash drive's memory of NOR or NAND type.

Controller 103 is also connected with a user interface module 105. Module 105 is configured to allow a user to initiate operation of system 101, notify user about operational state of the system, display result of the antivirus analysis, and receive user instructions upon completion of antivirus analysis. In one example embodiment, the user interface module 105 can be implemented as a liquid crystal display (LCD) with graphical user interface (GUI) and touch screen functionality. The GUI may provide elements of control, which allow user to, for example, initiate the work of system 101. Also GUI provides to the user detailed information about harmful or suspicious objects found on PC 109, as well as actions performed to treat the detected malware. In another example embodiment, the user interface module 105 may be implemented as a plurality of control buttons and light-emitting diode indicators, which indicate progress of antivirus analysis of PC 109. For example, different colors can be used to indicate such events, as "PC is checked and does not contain harmful software", and also "PC is checked and contains harmful software". Yet in another embodiment, the user interface module 105 can also use audio signals to indicate, for example, the time remaining to complete antivirus analysis, or the presence or absence of harmful software on PC 109.

Figure 2:
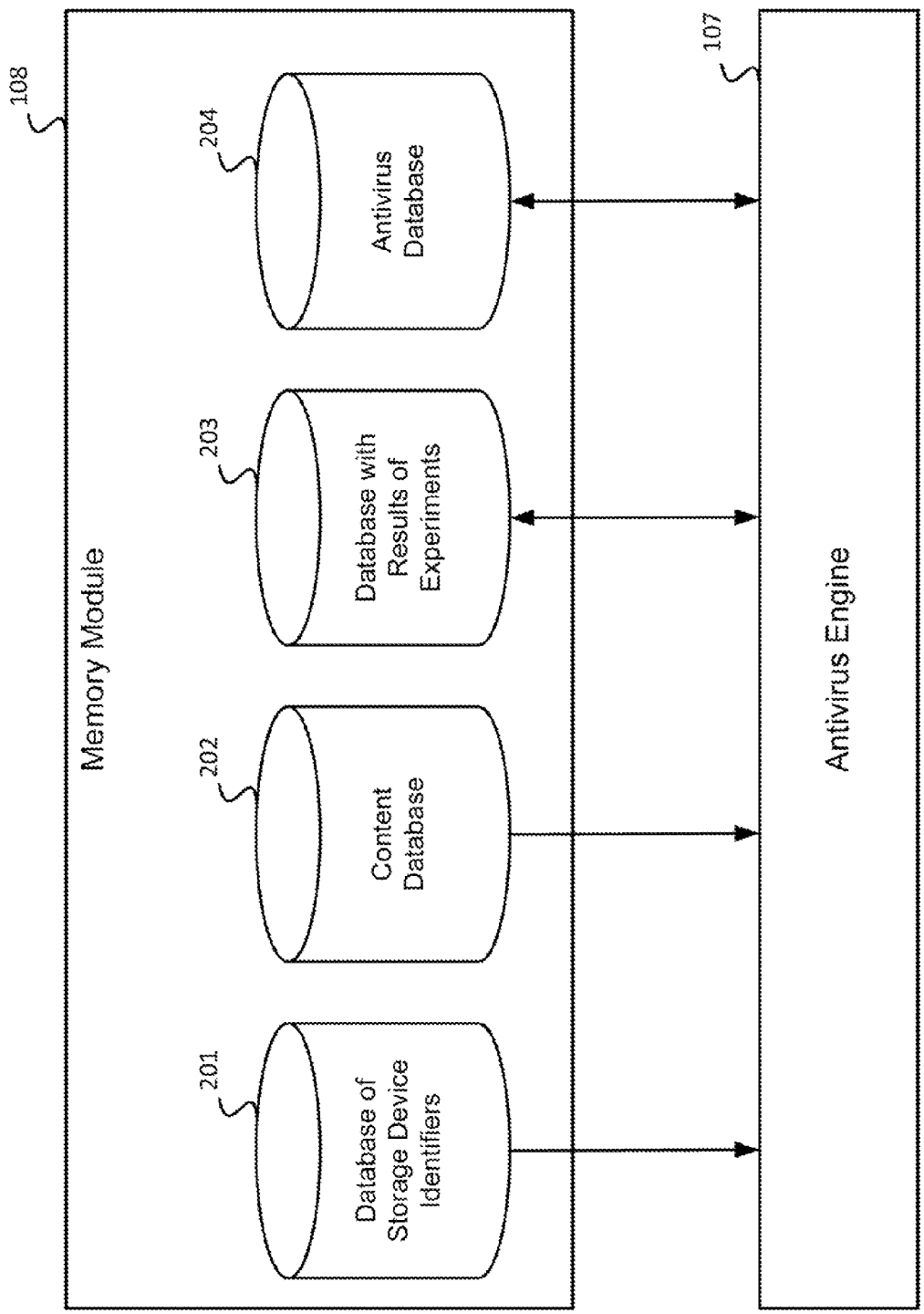
FIG. 2 illustrates a detailed schematic diagram of memory components of the portable security device according to one example embodiment.

FIG. 2 depicts interaction between antivirus engine 107 and memory module 108 of system 101. The antivirus engine 107 and memory module 108 are the primary elements of the system 101. For performance of actions related to detection and removal of harmful software from PC 109, the antivirus engine 107 interacts with databases stored in the memory module 108. In one example embodiment, system 101 may have four different databases: a database of data storage device identifiers 201, content database 202, database with results of experiments 203, and antivirus database 204. The database of storage device identifiers 201 contains information used by the antivirus engine 107 to simulate various data storage devices, and in particular, various Flash drive devices. In alternative embodiments, other types of data storage devices may be simulated by system 101 and, therefore, identifiers of those types of devices will be stored in database 201. Flash drive device will be in an exemplary embodiment.

In one example embodiment, the database of storage device identifiers 201 may contain the names of Flash drives, their file systems, their storage capacities, the manufacturer names, and others types of information used by system 101 to simulate different Flash drive. This information can be structured in such a way that all above-indicated parameters will be combined to identify models of known and popular Flash drives. For instance, the information describing Kingston Flash drive can include such parameters as: the name of flash drive—Kingston UFD, manufacturer—Kingston Inc., file system—FAT32, the storage capacity—4 Gb. Thus, each time system 101 connects to the PC 109, antivirus engine 107 uses information from the database 201 to simulate connection of Kingston Flash drive to PC 109.

The content database 202 contains large volume of data that can be used to fill the memory of the simulated Flash drive. Such data can include different folders with different names, files with different names and extensions and so on. In one example embodiment, the contents of the files can include pseudorandom data. For the tasks of detection and removal of harmful software, including unknown malware, the data from the content database is used to simulate the real content of the Flash drive, and also, it makes it possible to detect malware on PC 109 through the analysis of changes to the data stored on the simulated Flash drive.

Data from the content database 202 is selected by antivirus engine 107 taking into account the need for studying, in the course of the simulation of connection to PC 109 of Flash drive, these or other special features of the behavior of harmful software detected by the antivirus module 107. Thus, for instance, for each simulated Flash drive, antivirus engine 107 can select from the content database 202 several folders and the archives with different names and different content. Such content can include files with different extensions. For example, after creating several folders and archives on the simulated Flash drive it is possible to detect if PC 109 has harmful software, which copies itself into these folders and archives, manifesting in this case the functional of the virus-companion, whose executable file has the same name as some application, but another extension. Frequently, instead of the extension .EXE, virus-companion is located in the file with the extension .COM, which ensures his loading and starting during execution of program with the same name. For the files with the extension .EXE, the antivirus engine 107 can determine if there is harmful software on PC 109 capable of infecting executable files by adding malicious code to them. For the files with the extension .DOC, the antivirus engine 107 can determine if there is harmful software on PC 109 that possesses the destructive functionality capable of distorting or destroying the information in the document or to make that document inaccessible for reading. For the next simulated Flash drive, the antivirus engine 107 can select from the content database 202 different content suitable for more detailed analysis of the behavior of the harmful software detected on PC 109.

The above examples are merely illustrative and do not limit the capabilities of the system 101. The selected folders and files with different extensions used for antivirus analysis by module 107 can be of any quantity. It should be noted that system 101 does not possess any statistical signs indicating to PC 109 that it is system 101 rather than the simulated Flash drive that is being connected to PC 109. Therefore, there is no way for a malware on PC 109 to distinguish system 101 from the simulated Flash drive and take countermeasures against system 101. Nor should it be possible to design such a malware that can detect system 101.

Figure 3:
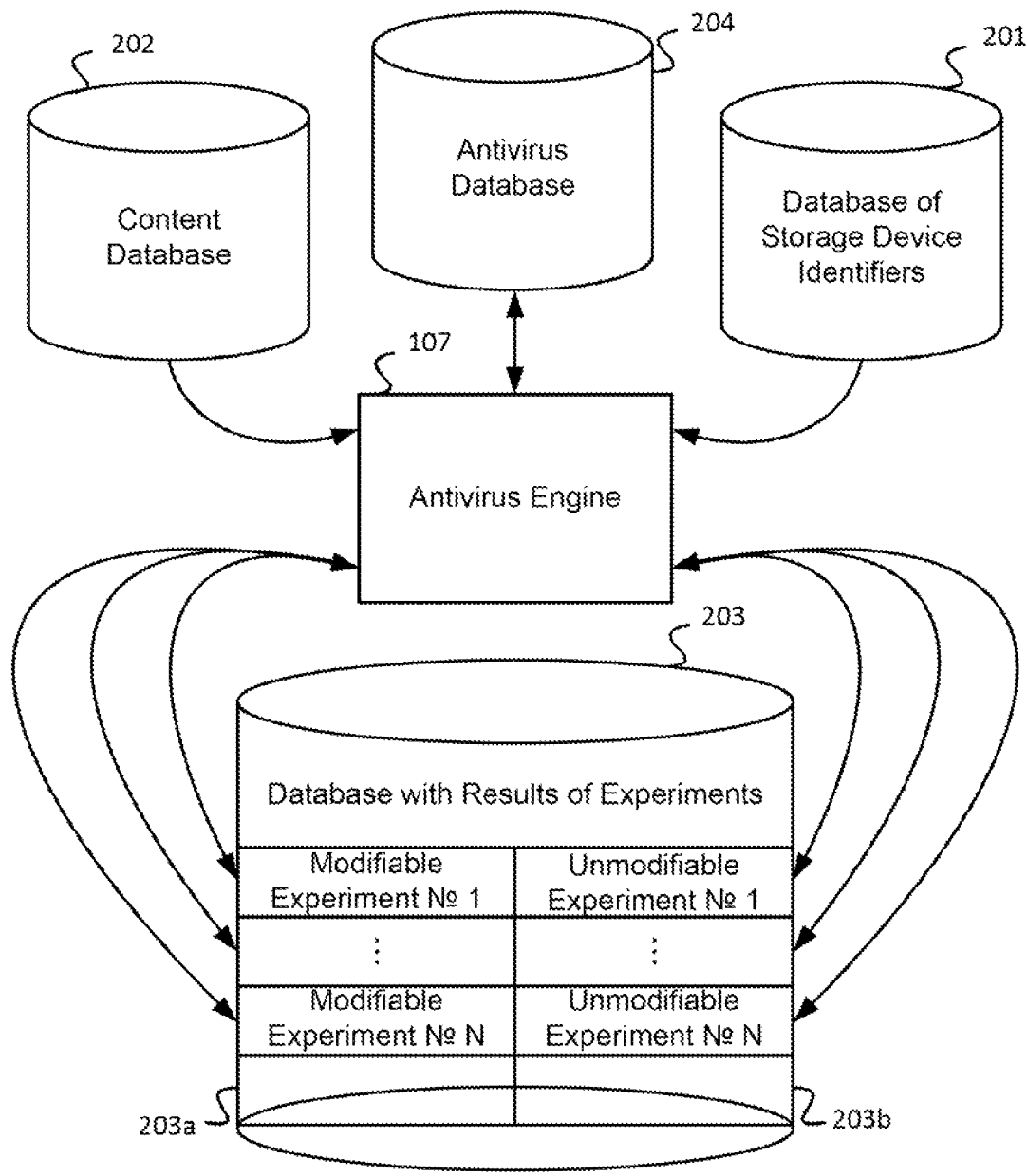
FIG. 3 illustrates a detailed schematic diagram of interaction of components of the portable security device according to one example embodiment.

FIG. 3 illustrates interaction between antivirus engine and databases located in the memory module of system 101. For simulation of the connection of a Flash drive to PC 109 for the purpose of detection and removal of harmful software, the antivirus engine 107 selects from database 201 an identifier of the simulated Flash drive and from content database 202 data to fill the memory of the simulated Flash drive. This data set makes it possible to simulate any known Flash drive, in this case non-empty. Further, information from these two databases is copied twice into the database with the results of experiments 203. The database containing results of experiments 203 is the third database in the module memory 108. Each collection of information from the content database 202 and/or from the database of storage device identifiers 201, selected by the antivirus engine 107 for purpose of simulation of a connection of a Flash drive to PC 109 is considered a malware detection experiment data.

The database of data with the results of experiments 203 may be divided into two parts. The first part of the database 203a will include data for simulation of any known Flash drives. This data is transferred to PC 109 for the purpose of detection and removal of harmful software on PC 109. The second part of database 203b includes a copy of the same data, but it will not be transferred on PC 109. Instead, this data is used for comparison with the information from the first part of the database 203a after completion of an experiment. Thus, the first part of the database with the results of the experiments 203a stores information for the simulation of Flash drives. This information is considered to be modifiable experiment data because harmful software on PC 109 can introduce changes in this information in the course of simulation of the Flash drive to PC 109. The second part of the database 203b stores unmodifiable experiment data, which is used only for the comparison with the modified experiment data from database 203a. It should be noted that if antivirus engine 107 selects from the database of storage device identifiers 201 information, which will identify the simulated Flash drive, for example, the Kingston Flash drive with storage capacity of 4 Gb, then antivirus engine 107 will isolate 4 Gb of memory for this variable experiment in the database 203a. Antivirus engine 107 can partially or completely fill this storage capacity with information from the content database 202, thereby forming a modifiable experiment. In this case, the second part of the database 203b can be filled with a copy of the information from database 203a and will be used for comparison after experiments have been completed.

In one example embodiment, the antivirus engine 107 for purpose of detection and the removal of harmful software can repeatedly select information from the content database 202 and database of storage device identifiers 201, thus forming collections of the modifiable and unmodifiable experiment data. In this case, the formation of experiments is based on the adaptive approach. In the case of detection of differences between the modifiable and unmodifiable experiment, i.e., the detection of suspicious activity, the next experiment can be specifically generated to provoke potentially harmful software on PC 109, on those actions, which system 101 wants to study. Thus, for instance, after revealing in the course of the comparison of experiments, creation on the simulated Flash drive of the autorun.inf file, the system 101 can generate a second experiment on the simulated Flash drive, which contains the autorun.inf file, in order to determine if this file will be replaced by the malware on PC 109. Using these types of actions, the system 101 reveals the specific behavior of known or unknown malware on PC 109. Also, the system 101 may automatically change the number of experiments necessary for identification of malware on PC 109. Thus, for instance, if in the course of the comparison of the modifiable and unmodifiable experiments data, it is revealed that the modified experiment data did not change, then the number of subsequent experiments, i.e., the simulations of the connection of a Flash drive, can be decreased up to one. And vice versa, if suspicious activity in the course of the comparison of the modifiable and unmodifiable experiments data is discovered, then the number of experiments can be increased for a more precise study of the behavior potentially harmful software on PC 109. It should be noted that, in one example embodiment, the database of experiments 203 will not be used. All experiments data, both modifiable and unmodifiable, can be recorded directly to the memory module 108, for example, into a folder, which is created for each experiment.

The antivirus database 204 is yet another database that can be stored in the memory module 108. The antivirus database 204 contains signatures of known harmful software, information used for heuristic analysis, and other types of malware-related information used by the antivirus engine 107 for detection and removal of harmful software on PC 109. For example, after the termination of one or more experiments, antivirus engine 107 may compare the modifiable and unmodifiable experiments data in databases 203a and 203b to identify changes and relationships between modified experiment data, and uses information from the antivirus database 204 to identify malicious programs or behaviors therein. In the case of detecting known malware, the antivirus engine 107 can generate an appropriate treatment mechanism, for example, to remove the known harmful software from PC 109.

Figure 4:
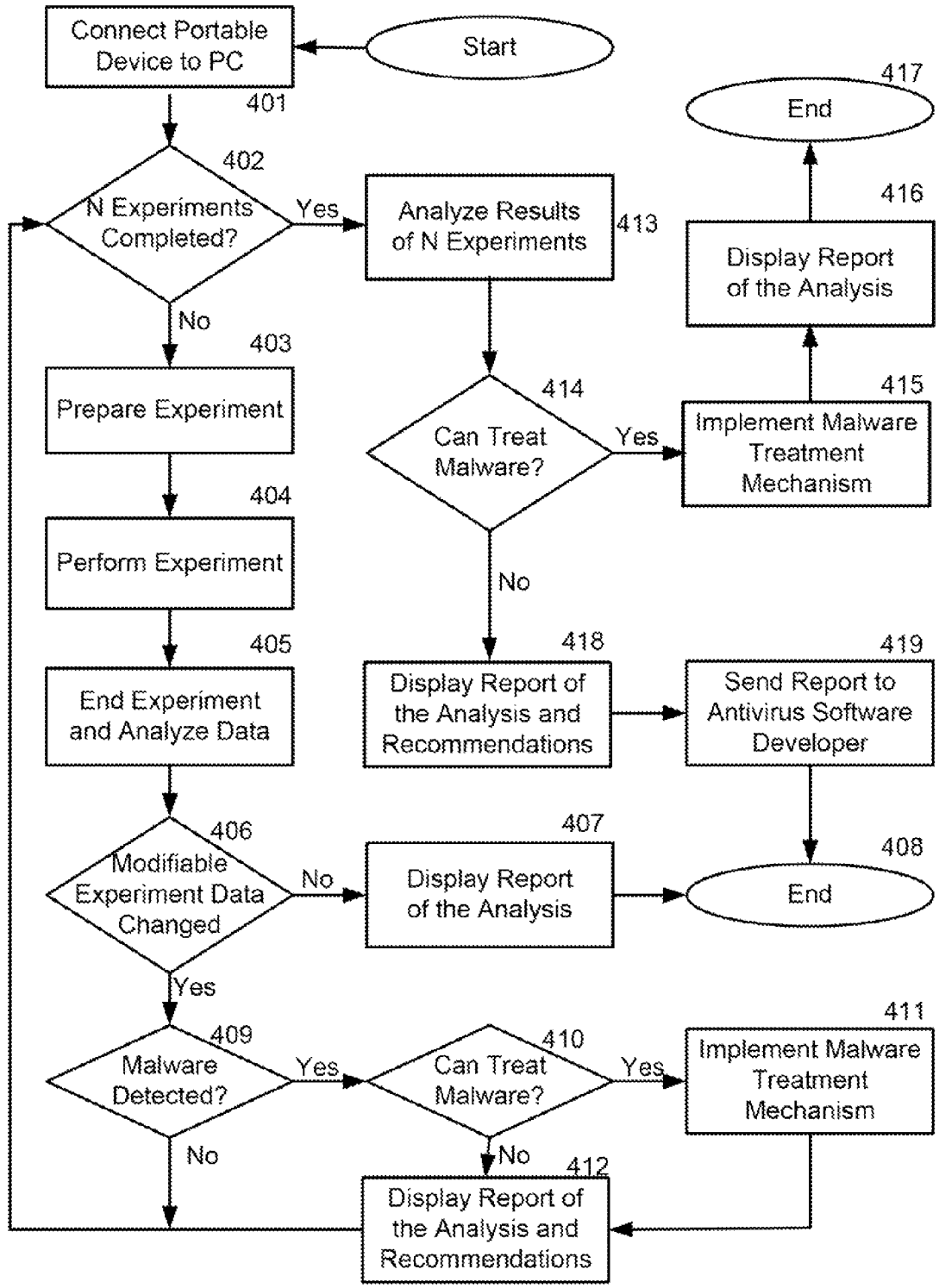
FIG. 4 illustrates a flow diagram of operation of the portable security device according to one example embodiment.

FIG. 4 depicts a flow diagram of operation of the portable device for detection and treatment of harmful software on a personal computer according to one example embodiment. As indicated above, system 101 is intended for detection and treating the harmful software on PC 109 by means of simulation of connection to the PC 109 of an external data storage device, such as Flash drive. System 101 can also simulate another PC, which has open access to stored resources, e.g., opened access to all data in any folder, for the purpose of detection and removal of harmful software from PC 109. Harmful software on PC 109 can perform different actions directed toward the portable device connected to PC 109, such actions including but not limited to, copying of malicious code into the memory of the connected device. System 101 makes it possible to identify harmful software executing on PC 109, through the simulation of the connection of a Flash drive and subsequent analysis of data, which was recorded into system 101 during simulation of the connection of Flash drive to PC 109.

As depicted, the operation of system 101 begins in step 401, in which system 101 connects to the PC 109 through the connection module 102, which in one example embodiment may be implemented as a USB interface. System 101 then powers up through the connection module 102 by PC 109. At this point, PC 109 does not see system 101 as any device. After the connection of system 101 to PC 109, the controller 103 sends to antivirus engine 107 signal for the activation of system 101. In one example embodiment, the task of the activation of the system 101 may be performed by the user through user interface module 105, which can contain administrative control elements for activating operation of system 101, such as start button. As it was said earlier, system 101 can then perform several experiments for the purpose of detection and removal of harmful software on PC 109, in this case the number of experiments can change dynamically or the number of experiments can be specified by user.

At step 402, systems 101 checks if all experiments have been performed or not. If not all experiments are completed, then the work of system continues in step 403. If the number of experiments is predetermined, then after each experiment the antivirus engine 107 checks the number of remaining experiments. As it was noted earlier, system 101 can adaptively calculate the number of required experiments, which must be carried out. Therefore, in step 402, antivirus engine 107, after studying the results of an experiment in databases 203a and 203b, can dynamically change the number of remaining experiments.

At step 403, system 101 prepares to conduct an experiment, i.e., simulating connection of a Flash drive to PC 109. In particular, the antivirus engine 107, after obtaining signal for the beginning of work from controller 103, selects from the database of storage device identifiers 201 information, which can identify the simulated Flash drive. This information includes, but not limited to, the names of storage device, its systems, its storage capacities, its manufacturer, and others types of data. Next, antivirus engine 107 selects data from the content database 202, which fill the memory of the simulated Flash drive. Such data can be different folders with different names, files with different names and extensions, and so on. The filling of the simulated Flash drive with data may be pseudorandom. So for each simulated Flash drive antivirus engine 107 select from the content database 202, for example, several folders and the archives with different names and content. Antivirus engine 107 can dynamically decide, what data is better to use for different experiments. Thus, for instance, if during the first experiment it is discovered, that the hash-sum of file with the extension .exe has changed, then it is highly probable that PC 109 is infected with a malware, which adds its code into executable files on the simulated Flash drive. In this case, in the next experiment, antivirus engine 107 may select from the content database 202 several files with the extension .exe for the purpose of checking the results of the previous experiment.

In one example embodiment, antivirus engine 107 places selected data from the content database 202 and information from the database of storage device identifiers 201 into the database with results of experiments 203, thus forming experiments on the simulation of a connection to a Flash drive. In this case, the database with results of experiments 203 is divided into two parts. The first part of the database 203a contains data associated with modifiable experiments, which is used for the simulation of any known Flash drive. Specifically, the set of data that determine the modifiable experiment, i.e., the simulated Flash drive, is directed to PC 109 for the purpose of detection and removal of harmful software. The data in the database 203a may be modified by harmful software on PC 109 by introducing certain changes in the experiment data, i.e., the information stored on the simulated Flash drive. The second part of the database 203b contains data associated with unmodifiable experiments used only for the purpose of comparison with the modifiable experiments data from database 203a.

Next, at step 404, an experiment is performed, i.e., the simulation of the connection of Flash drive to PC 109 takes place. Antivirus engine 107 selects from the database 203a a modifiable experiment data and transfers it through controller 103 to the connection module 102, and from it to PC 109. Depending on the capacity of storage of the simulated Flash drive and volume of information for its filling, antivirus engine 107 will calculate the capacity of filled and free storage. This information may be also sent through controller 103 to the connection module 102, and from it to PC 109. From the point of view of PC 109, activation of the simulated data storage device by system 101 looks like a typical connection of a Flash drive: PC 109 receives communications about the connection of a storage device with the specific name and storage capacity as well as communications about the permitted actions, and the data stored on the simulated Flash drive becomes accessible by the PC 109. Simulation of the connection lasts during a time interval selected by the antivirus engine 107. Duration can be selected randomly or based on events occurring during the simulation. Antivirus engine 107 can follow the state of the modifiable experiment stored in database 203a in real time, and, having observed active creation of files or changes in the files in the database 203a, can increase the duration of the simulation, and, on the contrary, if no suspicious activity was detected, antivirus engine 107 can decrease the duration of simulation.

Next, at step 405, the experiment is terminated, i.e., the simulation of the connections of a data storage device is stopped by system 101. In particular, the antivirus engine 107 ceases transfer of any data to PC 109 through controller 103 and connection module 102. Afterward turning off, antivirus engine 107 analyzes information of the modifiable experiment in database 203a. The analysis of obtained data can be achieved in the different sequence and in several stages. Thus, in one example embodiment, during the first step of the analysis, the antivirus engine 107 may compare the modifiable experiment data from database 203a with the unmodifiable experiment data from database 203b.

Further, if, at step 406, the antivirus engine 107 does not discover changes in the modifiable experiment data, i.e., there are no differences between the modifiable experiment data from database 203a and the unmodifiable experiment data from database 203b, then the antivirus engine 107 concludes that PC 109 is not infected by any malware. In this case, antivirus engine 107 may finish testing PC 109 and terminate simulated connection(s).

The operation of system 101 continues at step 407, in which antivirus engine 107 generates a report showing results of the analysis of the performed experiments. Report can be represented in the form the various documents, which include basic information about results of the antivirus analysis of PC 109, including information about any detected malware. After generation and display of the report, the operation of system 101 concludes at step 408.

In order to increase the probability of detecting harmful or suspicious software, antivirus engine 107 may select from the content database 202 a large set of data for the formation of the first experiment. This approach allows simulation of a storage device filled with different data of different sizes and type, in order not to miss harmful software, which can manifest specific activity to some types of files and not to other types of files. In one example embodiment, if, no malicious software has been discovered, at step 406, using one set of data, then processing may return to step 402, where another set of data may be assembled to conduct a second experiment, to confirm or refute the results of the first experiment.

If, at step 406, during or after the experiment, the antivirus engine 107 observes changes in the modifiable experiment data, as, for example, presence of added or altered files in database 203a, then antivirus engine 107 can perform an antivirus check of the added or altered files to identify the presence or the signs of behavior of known malware on PC 109. For example, a worm behaves by copying itself to the connected storage devices, e.g., a simulated Flash drive, or performs other harmful activity. Next, antivirus engine 107 compares the identified changes in the experiments data with the information from the antivirus database 204 for the detection, at step of 409, known harmful software stored in the modifiable experiment data in database 203a. The antivirus database 204 may contains information, which makes it possible to identify and remove known malware from PC 109, such as signatures of known malware, heuristic algorithms for detecting behavior of malware, etc.

If a malware is detected on PC 109 at step 409, the operation of system 101 will be continued at step 410 in which antivirus engine 107 assesses whether malware can be treated, e.g., removed from PC 109. For example, during analysis at step 405, antivirus engine 107 detects activity of a known worm. It is known from antivirus database 204 that this particular worm has static metadata and/or the constant hash-sum, i.e., this worm copies the same set of data to each simulated storage device connected to PC 109, then an automatic treatment method may be devised for this worm. In view of the invariability of the metadata and/or hash-sum of this worm, it is possible to search PC 109 for presence of this worm using its metadata or hash-sum. And if the worm is detected, it is possible to remove it from all data storage and memory devices of PC 109 by generating necessary treatment mechanism. Thus, if a malware is identified on PC 109 at step 409, and a mechanism for treatment of PC 109 is found at step 410, then the operation of system 101 will be continued at step 411, where antivirus engine 107 implements the mechanism of treatment, for example, the scenario in which it locates all copies of the worm on PC 109 and deletes them all.

After this, the operation of system 101 continues at step 412, in which a report of results of the analysis of PC 109 and malware treatment is generated and displayed to the user. The operation of system 101 also continues at step 412 when it is determined at step 410 that malware on PC 109 cannot be removed with the aid of known treatment mechanisms. In which case, a report is generated and displayed to the user. The report will contain results of the malware analysis and recommendations for further actions, which will help user to remove malware from PC 109 and prevent further propagation of the malware. It should be noted that actions of system 101 at step 412 can differ depending on the previous step. Thus, for instance, if the operation of system 101 was continued in step 412 after the fulfillment of step 411, then only status report may be generated and displayed at step 412. However, if the operation of system 101 was continued at step 412 after the fulfillment of step 410, the system 101 may include in the displayed status report user recommendations for removing the detected malware. After completion of step 412, the operation returns back to step 402.

If, at step 409, a known harmful software is not found on PC 109, then operation of system 101 again returns to step 402. In the course of the comparison of experiments, antivirus engine 107 can also reveal the activity, whose initial analysis will indicated presence of unknown malware on PC 109 (i.e., there is no corresponding record in the antivirus database 204 for this type of malware). For further analysis of this type of malware, the system 101 may return to step 402 for the generation of new experiment(s) for the purpose of obtaining larger volume of information about the newest possible harmful malware and deeper analysis of information for identification of the behavior of the malware and its removals from PC 109. Also, as explained earlier, system 101 adaptively calculates the number of different experiments necessary to fully analyze the unknown malware. Thus, for instance, if at step 405 in the course of the first experiment, antivirus engine 107 does not discover any known harmful software, and also it does not discover any suspicious activity related to modification of the variable experiment data, then antivirus engine 107 can select a minimum quantity of additional experiments, for example, one or two. However, if at step 405, antivirus engine 107 discovers suspicious activity associated with a potential new (i.e., unknown) malware, then antivirus engine 107 will dynamically change the number of experiments necessary to fully study the behavior of this unknown malware. The information related to the unknown malware identified after comparison of the modifiable and unmodifiable experiment data, can be stored in the antivirus database 204 to be analyzed thoroughly at step 413.

After it is determined at step 402 that system 101 completed all preset experiments, the flow passes to step 413 in which information from all completed experiments is analyzed by the antivirus engine 107 for presence of malware. For example, information about modifiable and unmodifiable experiments is collected for each instance of simulation of the Flash drive and compared by the antivirus engine 107 to determine any changes to the data stored in the Flash drive as a result of each experiment or group of experiments. In addition, antivirus engine 107 may analyzes any detected changes in the modifiable experiment data using malware-related information stored in the antivirus database 204 to detect any known or unknown harmful software or malicious activity in the modified experiments data. For example, the antivirus engine 107 may search for the following suspicious activities:

Was there use of autorun.inf file or other known procedures for recording harmful software on the simulated Flash drive, for example, LNK exploit?

Were there differences between different instances of the autorun.inf file depending on the experiment, for example, a change in the file path?

Were there differences between files written to the simulated Flash drive after completion of identical experiments and analysis of hash-sums of the files?

Were there instances of polymorphism of metadata, e.g., were the same names of files added to the simulated Flash drive used or did the names dynamically change?

Were there any behavioral patterns, such as destructive behavior, file infecting behavior, substitution of programs existing on the simulated Flash drive, or others?

Thus, on the basis of analysis of data of N experiments, at step 413, it is possible for the malware module 107 to unambiguously determine presence of malware on PC 109. For example, it is possible to reveal presence of unknown harmful software, such as worm, on PC 109. Also, it is possible to make conclusions about the possibility of the removal of the discovered unknown malware. Thus, for instance, if in the course of several experiments antivirus engine 107 detected additions of files to the simulated Flash drives, which possess static metadata and/or constant hash-sum, i.e., the files, not changed from one experiment to the next, then antivirus engine 107 concludes that this metadata or hash-sum is associated with a harmful software. In this case, module 107 may automatically create and apply to PC 109 a mechanism of treatment of said malware. For example, the module 107 may search all data storage and memory device of PC 109 for the identified metadata or hash-sum associated with the detected malware, e.g., the worm, and remove all copies of the worm from PC 109.

Thus, if it was determined at step 414 that during antivirus analysis unknown malware has been detected on PC 109, which can be removed using one of the treatment mechanisms, then operation of system 101 continues at step 415, in which antivirus engine 107 implements the selected malware treatment mechanism on PC 109, for example, the scenario in which all copies of the detected malware, such as the worm, are found and removed from PC 109. After this, the operation of system 101 continues at step 416, in which a report with the results of the analysis and treatment is generated and displayed. The report may include information about performed experiments, known and unknown malware detected and removed from PC 109 and other information. The process then ends at step 417.

However, if it was discovered at step 414, that there is no possibility of the removal of the discovered unknown harmful software using any mechanism of the treatment, then the operation of system 101 continues at step 418, in which antivirus engine 107 generates and displays a report containing results of antivirus analysis as well as user recommendations, which are based on the type of detected malicious activity by the unknown harmful software. Thus, for instance, having observed that an unknown malware added its code into the files with the extension .exe, the recommendations provided by the antivirus engine 107 may include a warning to the user not to connect to PC 109 any storage devices, which contain files with .EXE extension. The recommendations can also describe a mechanism for manual removal of harmful software from PC 109, including which files must be moved, how and so on.

For the more thorough analysis of the detected unknown malware, preparation of the mechanism of treatment of malware, and for further updating of the antivirus database 204, the antivirus engine 107 can transmit through controller 103 to the communication module 106 data that identifies the detected unknown malware, which cannot be removed with the aid of the available mechanism of treatment. Subsequently, this data may be transferred, at step 419, to the antivirus server of the antivirus software developer. Depending on the type of the communication module 106 the transmission of data can be performed using wired or wireless network connections. For example, the USB interface of the communication module 106 can be utilized. In one example embodiment, system 101 can be connected through communication module 106 to PC 109, which provides wired or wireless connection to the Internet. Controller 103 obtains from the communication module 106 information about type of connection with PC 109 and reports this information to antivirus engine 107. Antivirus engine 107 communicates to the controller 103 the Internet address of the antivirus servers of the antivirus software developer, and controller 103 transmits this information to the communication module 106, which establishes connection through PC 109 with the server for transmitting data about the unknown malware to the server. If the communication module 106 uses wireless technology, such as Wi-Fi, 3G or CDMA, then system 101 can directly connect using wireless or cellular network to the antivirus server of the antivirus software developer.

In addition to data identifying the unknown malware which cannot be treated by the antivirus engine 107, system 101 can also transfer to the antivirus server such information as: information about the experiment which discovered unknown malware, where unknown malware was found and other information. The transmission of this type of information will help antivirus software developer to develop mechanisms of the treatment of new types of malware. Also, at step 419, system 101 may receive through the communication module 106 updates for the antivirus database 204 from the antivirus software developer. These updates may include information or instructions for the automatic treatment of necessary filed or removal of malware form PC 109. After completion of step 419, the antivirus engine 107 can delete all data from the database 203 and the operation of system 101 concludes at step 408.

As it was noted earlier, system 101 includes user interface module 105 used for control and display of information, activation of system 101, display of information about status of the system 101, about experiments performed, result of antivirus analysis, and implemented malware treatment mechanisms. In one example embodiment, this information may be presented using status reports. These reports may be generated in real time during operation of the system or after completion of all works. During performance of experiments on PC 109, antivirus engine 107 reports to controller 103 about each file checked and time to the end of the checking. Controller 103 transmits this data to user interface module 105. Thus, user receives real time feedback during operation of system 101 and it can see depending on the performance of user interface module 105 this information as the dynamically changing information about the last file checked and the time to the end of the antivirus analysis of PC 109. For example, the user interface module 105 can display to the user the progress of antivirus analysis carried out at step 405. Depending on the implementation, module 105 may also provide audio feedback indicating status of the system, e.g., the end of an experiment, the absence of harmful software, the removal of harmful software and so on.

After completion of all experiments and cumulative analysis of data obtained in the course of N experiments, antivirus engine 107 can generate and transmit reports to controller 103 about all carried out experiments, about files checked during the experiments, about detected and removed known malware, about detected known malware which could not be treated, and also about user recommendations for manual removal of untreated malware from PC 109. Controller 103 will transmit this information to user interface module 105. In various embodiments, antivirus engine 107 can generate reports in any text format, store it, for example, in the database with results of experiments 203 for purpose of transferring them through controller 103 to antivirus server when system 101 is connected to PC 109. It should be noted that depending on the process of operation of system 101 the contents of the report may differ. For example, report generated at step 407 can contain information about the files analyzed during each experiment. Report generated at step 412 can contain information about the detected known malware and applied treatment mechanisms. The report can also include information about detected malware for which treatment mechanisms could not be found and also about user recommendations for manually treating the malware. Report generated at step 416 can contain information about detected unknown malware to which treatment mechanism was applied. Report generated at step 418 can also include information about the detected unknown malware for which treatment mechanism could not be found and user recommendations for manually treating PC 109 to prevent propagation of the malware.

It should be noted that PC 109 can be infected with a malware, which can propagate through the network, such as net worms. Through the connection of the infected PC 109 to the network, this type of network malware can propagate from the infected PC 109 to other PCs. Therefore, in one example embodiment, system 101 may include an operating mode for searching and removing net worms and other types of network malware. For example, system 101 may be connected to the network card of PC 109 through connection module 102, e.g., an Ethernet port. In this case, system 101 may simulate not a data storage device but a PC connected to PC 109. This approach makes it possible to identify on PC 109 harmful software propagated through the network connection because network malware will use simulated connection to attempt to propagate to system 101. It will be clear to one skilled in the art that principles of simulation of storage devices and analysis of files changed by malware by the antivirus engine 107 will also work for detection of network malware on a simulated PC.

Figure 5:
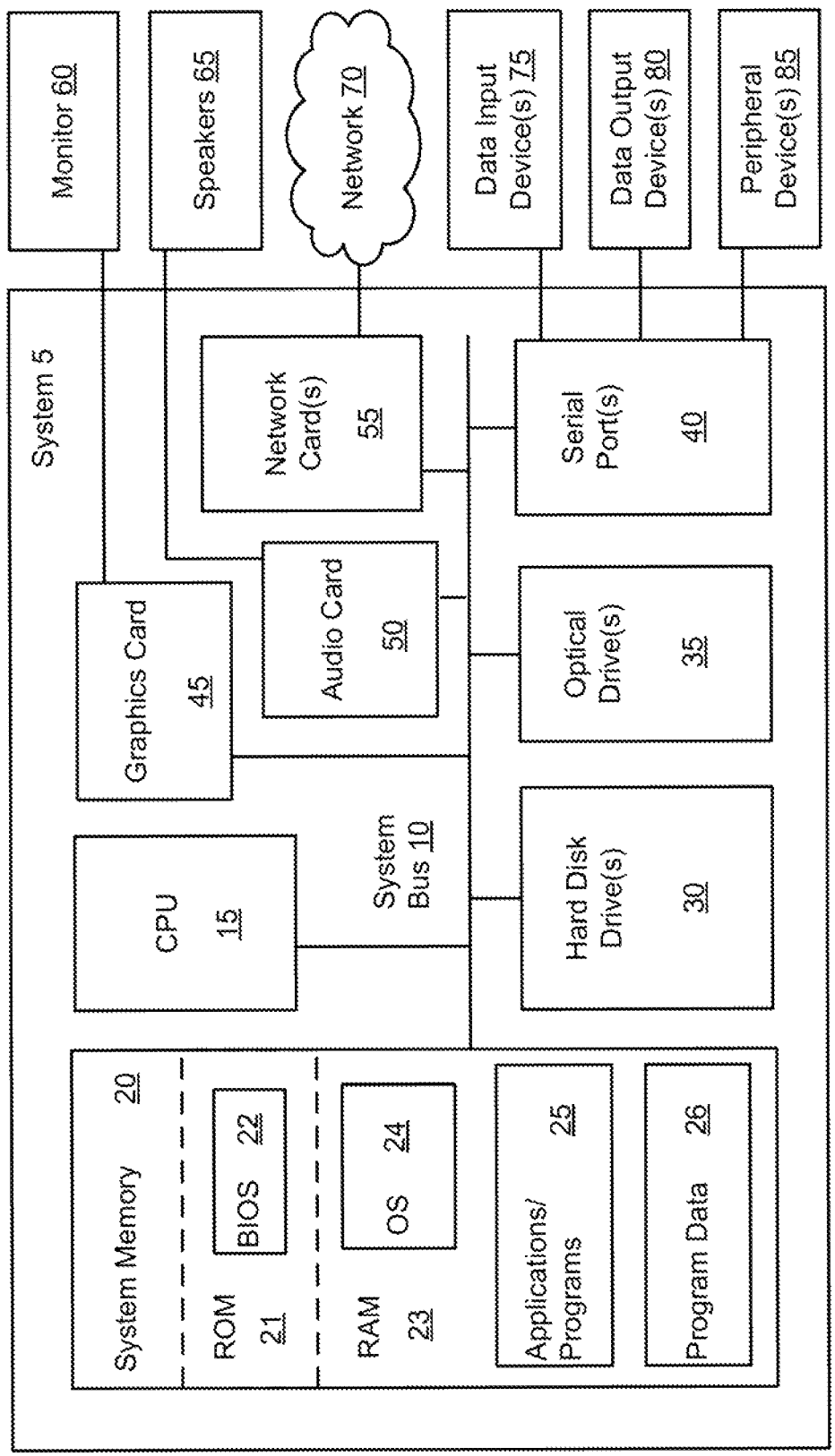
FIG. 5 illustrates a schematic diagram of a computer system according to one example embodiment.

FIG. 5 depicts an example embodiment of a computer system, which can be used to implement PC 109. It should be noted that system 5, is not limited to a PC, but may include a network server, a notebook, a tablet, a smart phone or other types of data processing or computing devices. The system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of the system 5, such as during start-up. RAM 23 stores operating system 24 (OS), such as Windows® XP or other type of operating system, that is responsible for management and coordination of processes and allocation and sharing of hardware resources in the system 5. System memory 20 also stores applications and programs 25, such as Internet browser application. Memory 20 also stores various runtime data 26 used by programs 25.

The system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary system 5 employs magnetic and optical disks, it should be appreciated by those skilled in the art that other types of computer readable media that can store data accessible by the system 5, such as magnetic cassettes, flash memory cards, digital video disks, RAMs, ROMs, EPROMs and other types of memory may also be used in alternative embodiments of the system.

The system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. The system 5 may also include graphics card 45, such as nVidia® GeForce® GT 240M or other video card, for interfacing with a monitor 60 or other video reproduction device. The system 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that other modifications than those mentioned herein possible without departing from the disclosed inventive concepts.

What is claimed is:

1. A method for detection and treatment of computer malware, the method comprising:
    connecting a portable security device to a computer;
    performing at least one malware detection experiment by the security device on the computer, wherein the at least one malware detection experiment includes simulating by the security device a connection to the computer of a simulated data storage device containing a predefined set of data, wherein the connection of the simulated data storage device to the computer is simulated by transferring at least a portion of the predefined set of data by the security device to the computer;
    identifying modifications in the set of data contained in the simulated data storage device after termination of the at least one malware detection experiment;
    performing antivirus analysis of the modified set of data to determine if the modifications to the set of data were performed by a malware on the computer;
    determining a treatment mechanism for the detected malware; and
    performing treatment of the detected malware on the computer.

2. The method of claim 1, further comprising:
    generating a user report including at least the results of the at least one performed malware detection experiment and the results of the treatment of the detected malware.

3. The method of claim 1, wherein the security device includes a database of data storage device identifiers containing information about different models and types of data storage devices, and wherein a set of said information is transferred to the computer by the security device in order to simulate the connection of the simulated data storage device to the computer.

4. The method of claim 1, wherein the security device includes a content database containing data from which the security device selects a predefined set of data for the at least one malware detection experiment.

5. The method of claim 1, wherein different sets of data within the predefined set of data are selected by the security device for different malware detection experiments.

6. The Method of claim 1, wherein a set of data selected for a subsequent malware detection experiment depends on the result of a preceding malware detection experiment.

7. The method of claim 1, wherein identifying modifications in the set of data contained in the simulated data storage device includes maintaining an unmodifiable copy of said set of data for comparison with the modifications to said set of data.

8. A portable security device for detection and treatment of computer malware, the device comprising:
    a communication interface for connecting the security device to a computer;
    a memory for storing at least one set of data for use in malware detection experiments; an antivirus engine configured to:
        perform at least one malware detection experiment on the computer, wherein the at least one malware detection experiment includes simulating a connection to the computer of a simulated data storage device containing a predefined set of data, wherein the connection of the simulated data storage device to the computer is simulated by transferring at least a portion of the predefined set of data by the security device to the computer;
        identify modifications in the set of data contained in the simulated data storage device after termination of the at least one malware detection experiment;
        analyze a modified set of data for presences of computer malware;
        determine a treatment mechanism for the detected malware; and
        perform treatment of the detected malware on the computer.

9. The system of claim 8, wherein the antivirus engine is further configured to generate a user report including at least the results of the at least one performed malware detection experiment find the results of the treatment of the detected malware.

10. The system of claim 8, wherein the security device includes a database of data storage device identifiers containing information about different models and types of data storage devices, and wherein a set of said information is transferred to the computer by the security device in order to simulate the connection of the simulated data storage device to the computer.

11. The system of claim 8, wherein the security device includes a content database containing data from which the security device selects a predefined set of data for the at least one malware detection experiment.

12. The system of claim 8, wherein different sets of data within the predefined set of data are selected by the security device for different malware detection experiments.

13. The system of claim 8, wherein a set of data selected for a subsequent malware detection experiment depends on the result of a preceding malware detection experiment.

14. The system of claim 8, wherein identifying modifications in the set of data contained in the simulated data storage device includes maintaining an unmodifiable copy of said set of data for comparison with the modifications to said set of data.

15. A computer program product embedded in a non-transitory computer-readable storage medium, the computer-readable storage medium comprising computer-executable instructions for detection and treatment of computer malware, the medium comprising instructions for:

connecting a portable security device to a computer;

performing at least one malware detection experiment by the security device on the computer, wherein a malware detection experiment includes simulating by the security device a connection to the computer of a simulated data storage device containing as predefined set of data, wherein the connection of the simulated data storage device to the computer is simulated by transferring at least a onion of the redefined set of data by the security device to the computer;

identifying modifications in the set of data contained in the simulated data storage device after termination of the at least one malware detection experiment;

performing antivirus analysis of the modified set of data to determine if the modifications to the set of data were performed by a malware on the computer;

determining a treatment mechanism for the detected malware; and performing treatment of the detected malware on the computer.

16. The computer program product of claim 15, wherein the non-transitory computer-readable storage medium further comprises instruction for generating a user report including at least the results of the at least one performed malware detection experiment and the results of the treatment of the detected malware.

17. The computer program product of claim 15, wherein the security device includes a database of data storage device identifiers containing information about different models and types of data storage devices, and wherein a set of said information is transferred to the computer by the security device in order to simulate the connection of the simulated data storage device to the computer.

18. The computer program product of claim 15, wherein the security device includes a content database containing, data from which the security device selects a predefined set of data for the at least one malware detection experiment.

19. The computer program product of claim 15, wherein different sets of data within the predefined set of data are selected by the security device for different malware detection experiments.

20. The computer program product of claim 15, wherein a set of data selected for a subsequent malware detection experiment depends on the result of a preceding malware detection experiment.

21. The computer program product of claim 5, wherein instructions for identifying modifications in the set of data contained in the simulated data storage device include instructions for maintaining an unmodifiable copy of said set of data for comparison with the modifications to said set of data.

* * * * *